(12) United States Patent
Naderer (10) Patent No.: US 11,869,685 B2
(45) Date of Patent: Jan. 9, 2024

(54) THERMISTOR AND METHOD FOR PRODUCING SAID THERMISTOR

(71) Applicant: TDK Electronics AG, Munich (DE)

(72) Inventor: Michael Naderer, Deutschlandsberg (AT)

(73) Assignee: TDK Electronics AG, Munich (DE)

( * ) Notice: Subject to any disclaimer, the term of this patent is extended or adjusted under 35 U.S.C. 154(b) by 109 days.

(21) Appl. No.: 17/420,492

(22) PCT Filed: Dec. 17, 2019

(86) PCT No.: PCT/EP2019/085664
§ 371 (c)(1),
(2) Date: Jul. 2, 2021

(87) PCT Pub. No.: WO2020/144012
PCT Pub. Date: Jul. 16, 2020

(65) Prior Publication Data
US 2022/0084726 A1 Mar. 17, 2022

(30) Foreign Application Priority Data
Jan. 8, 2019 (DE) .......................... 102019100316.4

(51) Int. Cl.
*H01C 7/00* (2006.01)
*H01C 1/148* (2006.01)
*H01C 17/065* (2006.01)
*H01C 17/28* (2006.01)

(52) U.S. Cl.
CPC ............ *H01C 7/008* (2013.01); *H01C 1/148* (2013.01); *H01C 17/065* (2013.01); *H01C 17/28* (2013.01)

(58) Field of Classification Search
CPC ....... H01C 7/008; H01C 1/148; H01C 17/065
See application file for complete search history.

(56) References Cited

U.S. PATENT DOCUMENTS

| | | | |
|---|---|---|---|
| 5,907,271 A | 5/1999 | Hirano et al. | |
| 5,990,778 A | 11/1999 | Strumpler | |
| 6,429,533 B1 | 8/2002 | Been | |
| 9,338,913 B2 * | 5/2016 | Feichtinger | ............ H01G 4/012 |
| 2010/0014213 A1 | 1/2010 | Wozniak | |
| 2012/0056709 A1 | 3/2012 | Kajino | |
| 2013/0088319 A1 | 4/2013 | Saito et al. | |

FOREIGN PATENT DOCUMENTS

| | | |
|---|---|---|
| CN | 107221397 A | 9/2017 |
| DE | 19727009 A1 | 1/1999 |
| DE | 19917631 A1 | 10/2000 |

(Continued)

OTHER PUBLICATIONS

JP2001110605, machine translation. (Year: 2001).*

(Continued)

*Primary Examiner* — Kyung S Lee
(74) *Attorney, Agent, or Firm* — Nixon Peabody LLP (57) ABSTRACT

A thermistor having a ceramic main body, which contains a ceramic material as the main constituent. The ceramic main body has at least one electrically insulating layer. The electrically insulating layer is arranged within the ceramic main body and contains a main component which has a composition different from the ceramic material.

19 Claims, 6 Drawing Sheets

(56) References Cited

FOREIGN PATENT DOCUMENTS

| | | | |
|---|---|---|---|
| DE | 102005050638 A1 | 6/2007 | |
| DE | 102011081939 A1 | 3/2012 | |
| EP | 0779630 A1 | 6/1997 | |
| JP | H0864421 A | 3/1996 | |
| JP | H1045469 | * | 2/1998 |
| JP | 2001110605 A | 4/2001 | |
| JP | 2001338805 A | 12/2001 | |
| JP | 2002-100505 A | 4/2002 | |
| KR | 2017/0109796 A | 10/2017 | |
| WO | WO-2005078791 A1 | * | 8/2005 |
| WO | WO 2006/080805 A1 | 8/2006 | |

OTHER PUBLICATIONS

JPH1045469, machine translation. (Year: 1998).*
International Search Report, with English translation, and Written Opinion of International Searching Authority corresponding to International Patent Application No. PCT/EP2019/085664, dated Mar. 19, 2020 (13 pages).

* cited by examiner

THERMISTOR AND METHOD FOR PRODUCING SAID THERMISTOR

CROSS-REFERENCE TO RELATED APPLICATIONS

This application is a U.S. National Stage of International Application No. PCT/EP2019/085664, filed Dec. 17, 2019, which claims the benefit of German Patent Application No. 102019100316.4, filed Jan. 8, 2019, both of which are incorporated herein by reference in their entireties.

The invention relates to a thermistor, having a ceramic main body, and to a method for producing the thermistor.

For measuring temperatures for monitoring and control in a wide variety of applications, thermistors based on sintered ceramic materials are primarily used. Thus, thermistors may be used for example as temperature sensors or for surge protection.

DE 2011 081 939 A1 discloses a thermistor that has a multilayered structure.

An object of the present invention is to provide a thermistor that has improved properties. It is also an object of the present invention to provide a production method for the thermistor.

The present object is achieved by a thermistor according to claim 1. Further embodiments of the thermistor and a method for producing the thermistor can be taken from further claims.

A thermistor that has a ceramic main body which contains a ceramic material as the main constituent is provided. The ceramic main body has at least one electrically insulating layer, which is arranged within the ceramic main body. The electrically insulating layer contains a main component of which the composition is different from the composition of the ceramic material.

In other words, the ceramic main body has at least one layer in its interior that is not suitable for conducting electrical current. Furthermore, the electrically insulating layer contains a main component which has a composition that is not the same as the composition of the ceramic material.

A method for producing a thermistor, comprising a ceramic main body, is also provided. In the method, the ceramic main body is produced in such a way that a green sheet stack is formed from a multiplicity of green sheets, is subsequently pressed, decarburized and sintered, an electrically insulating layer being applied to at least one of the green sheets before the forming of the green sheet stack.

Furthermore, the electrically insulating layer may be arranged in such a way that the thermistor has a higher R25 value than another thermistor that is formed without the electrically insulating layer, but is otherwise the same. In other words, the thermistor has a higher R25 value with the electrically insulating layer than without the electrically insulating layer.

Here and in the following, the R25 value may be understood as an electrical resistance of the thermistor that the thermistor has at 25° C.

The R25 value is, inter alia, indirectly proportionally dependent on a conducting cross-sectional area of the thermistor. In other words, the smaller the conducting cross-sectional area, the greater the R25 value of the thermistor.

Here and in the following the conducting cross-sectional area may be understood as meaning a cross-sectional area of an active volume region of the ceramic main body. The active volume region is decisively involved in the further conduction of electrical current from one outer contact to a further outer contact of the thermistor. The active volume region may comprise the entire volume of the ceramic main body. The conducting cross-sectional area is usually perpendicular to the direction of flow of the electrical current. Conventionally, the conducting cross-sectional area corresponds to an actual cross-sectional area of the ceramic main body that is perpendicular to the direction of flow of the electrical current. The actual cross-sectional area lies in a plane and is exclusively delimited by outer surfaces and/or outer edges of the ceramic main body, the outer surfaces and/or outer edges intersecting the plane in which the actual cross-sectional area lies. In other words, the actual cross-sectional area is exclusively determined by the shape and extent of the ceramic main body.

An increase of the R25 value can be achieved by the electrically insulating layer being arranged in such a way that the conducting cross-sectional area of the active volume region of the ceramic main body is reduced. For instance, the electrically insulating layer may be arranged in the ceramic main body in such a way that it is not parallel to the direction of flow of the electrical current. Preferably, the electrically insulating layer is perpendicular to the direction of flow of the electrical current.

In other words, the electrically insulating layer defines a conducting cross-sectional area that is smaller than the actual cross-sectional area of the ceramic main body. As a result, the thermistor can have a very high R25 value, for example in the MΩ range, without the conducting cross-sectional area of the ceramic main body of the thermistor having to be reduced, for example by means of mechanical reworking. This has the consequence that risks that may arise for the ceramic main body due to the mechanical reworking are avoided.

The electrically insulating layer may lie in a plane and be kept at a distance from one or more outer surfaces of the ceramic main body that intersect the plane. In other words, the electrically insulating layer is not in direct contact with at least one outer surface that intersects the plane in which the electrically insulating layer lies.

Furthermore, the electrically insulating layer may have at least one cutout. The configuration of the cutout is in this case not restricted to any specific shape. Thus, the cutout may for example have a shape which is selected from a group of shapes that includes at least round, oval and polygonal shapes.

The electrically insulating layer may also consist of at least two separate sublayers, which lie in a common plane and are separated from one another by a distance. In other words, the two sublayers are not in direct contact with one another at any point.

By configuring the electrically insulating layer according to one or more of the aforementioned embodiments, the conducting cross-sectional area of the active volume of the ceramic main body can be defined very exactly. As a result, the R25 value can be set with high precision.

The electrically insulating layer may also contain a main component which comprises an inorganic, electrically insulating material. Preferably, the inorganic, electrically insulating material may be selected from a set that includes at least varistor ceramics and capacitor ceramics. These materials are advantageous because they do not significantly conduct electrical current under the operating conditions of the thermistor.

Furthermore, the electrically insulating layer may contain a main component which has a spinel structure. Since the electrically insulating layer is applied to a green sheet, good bonding of the electrically insulating layer on the green sheet is advantageous. As the ceramic materials for thermistors usually have a spinel structure, it is advantagous when the electrically insulating layer also contains a main component that has the same structure as the ceramic material which is contained in the green sheet. This ensures good bonding of the electrically insulating layer on the green sheet.

The electrically insulating layer may also take the form of a cavity in the ceramic main body. For this, a layer of thermally decomposable material is applied between two green sheets. In a subsequent sintering process, the thermally decomposable material diffuses out of the main body and leaves behind a cavity as an electrically insulating layer.

In a preferred configuration, the thickness of the insulating layer is more than 0.5 µm. The electrically insulating layer may have a thickness of up to 5 µm. The thicknesses of a number of insulating layers added together may make up a significant proportion of the dimension of the ceramic main body in the thickness direction.

Furthermore, the ceramic main body may have one or more electrically conductive layers which are arranged within the ceramic main body in such a way that the electrically conductive layers define the active volume region of the ceramic main body and the electrically insulating layers are arranged within the active volume region.

The active volume region may be exclusively defined by the electrically conductive layers. Preferably, the active volume region may be defined by the electrically conductive layers and outer surfaces of the ceramic main body.

The electrically conductive layers may also be in direct contact with at least one outer surface of the ceramic main body. Preferably, the electrically conductive layers are arranged in such a way that one or more secondary surfaces of the electrically conductive layers are in direct contact with the outer contacts of the thermistor. Particularly preferably, the electrically conductive layers extend over the entire actual cross-sectional area of the ceramic main body. Secondary surfaces should be understood here as meaning surfaces of the electrically conductive layer that are decisively defined by the thickness of the electrically conductive layer.

The direct contact of the electrically conductive layers with the outer contents of the thermistor can have the effect that negative influences on the properties of the thermistor that arise due to production-related variations in the configuration of the outer contacts are reduced. As a result, thermistors with specific characteristic properties can be produced particularly reproducibly.

The electrically conductive layers may contain at least one material which is selected from a set of metals that includes at least silver, palladium and any silver and palladium alloys.

Furthermore, in the method for applying the electrically insulating layer, a template may be used, the template being configured in such a way that the electrically insulating layer has a high imaging fidelity with respect to the template.

A high imaging fidelity is intended here and hereinafter to be understood as meaning that the configuration of the electrically insulating layer on the green sheet does not deviate significantly from the configuration of the template.

In order to achieve this, a screen printing screen may be used as the template, the screen printing screen having a negative of the electrically insulating layer and at least one bar, which divides the negative into at least two separate regions. The bar is configured in such a way that the screen is not significantly deformed during the application of the electrically insulating layer. As a result, a high imaging fidelity is achieved.

In the method, an electrically conductive layer may also be applied to at least one further green sheet. The application of the electrically conductive layer may take place for example by means of a sputtering process.

Furthermore, the method may be carried out in such a way that the green sheets are stacked along a longitudinal axis of the ceramic main body.

The longitudinal axis is intended here and hereinafter to be understood as meaning an axis of the ceramic main body that runs parallel to the direction of the greatest spatial extent of the ceramic main body. Preferably, the longitudinal axis runs parallel to one or more edges of the ceramic main body that have the greatest extent. For the case where the ceramic main body has a number of equivalent spatial extents that run parallel and not parallel to the stacking direction of the green sheets and can each be regarded as the greatest spatial extent, an axis which runs parallel to the extent that runs parallel to the stacking direction of the green sheets is defined as the longitudinal axis.

Apart from the aforementioned steps, the method also comprises further steps that are necessary for producing a thermistor. Such further steps are for example:

pressing a green sheet stack in order to obtain a pressed green sheet stack, decarburizing the pressed green sheet stack in order to obtain a pressed and decarburized green sheet stack, sintering the pressed and decarburized green sheet stack in order to obtain a ceramic main body, applying outer contacts to the ceramic main body in order to obtain the thermistor.

The invention is described in more detail below on the basis of schematic representations of exemplary embodiments.

Elements that are the same, similar or appear to be the same are provided with the same reference signes in the figures. The figures and the relative sizes of elements in the figures are not drawn to scale.

Figure 1:
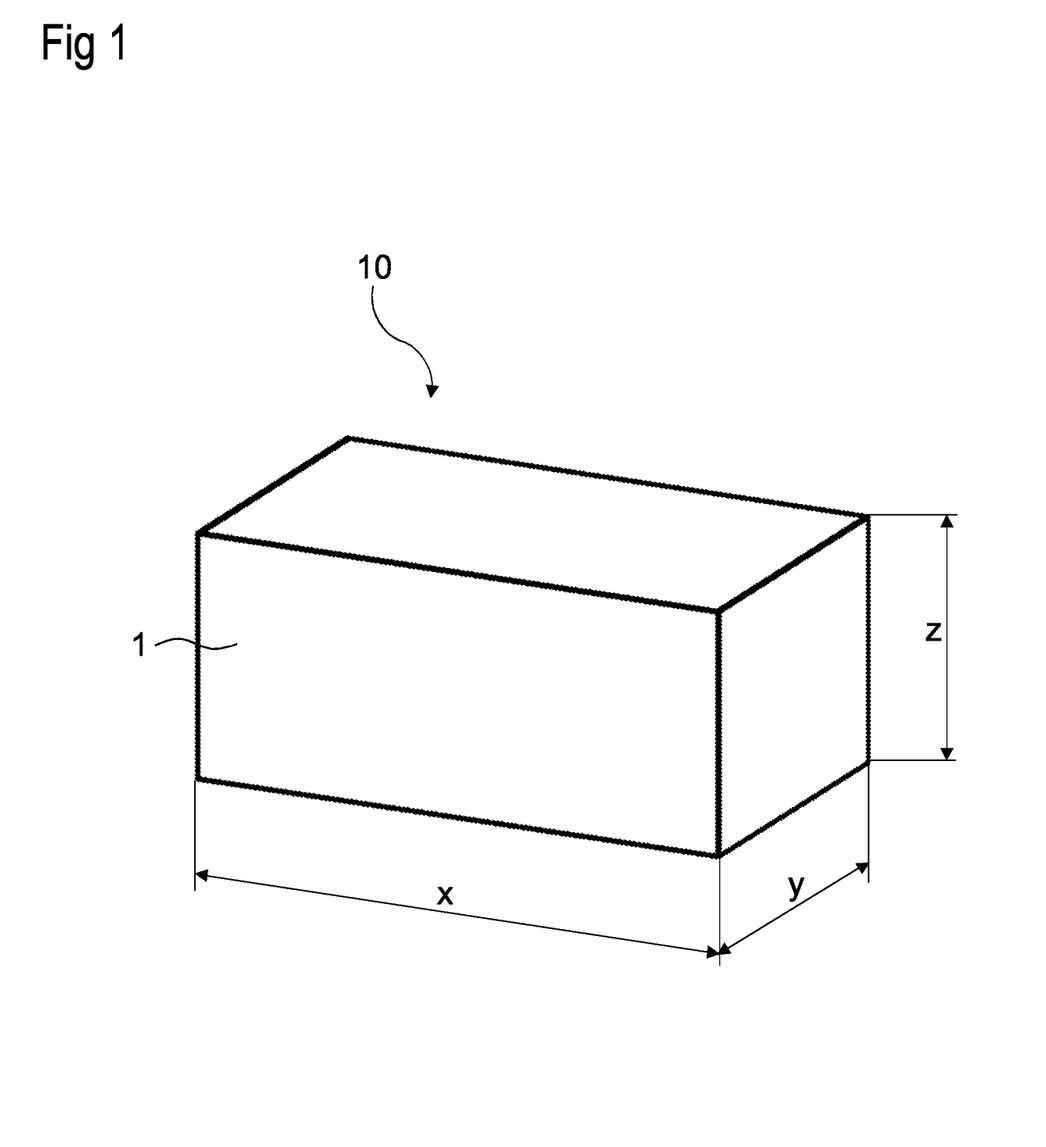
FIG. 1 shows a spatial representation of a thermistor.

FIG. 1 shows a thermistor 10, which comprises a ceramic main body 1 and outer contacts (not shown). The spatial extent of the ceramic main body 1 is illustrated by dimensioning arrows x, y and z. Since the dimensioning arrows x, y and z respectively run parallel to an axis of the same name in a Cartesian coordinate system, the dimensioning arrows are also referred to here and hereinafter as the corresponding axis of the coordinate system. In other words, the dimensioning arrow x corresponds to an x axis, the dimensioning arrow y corresponds to a y axis and the dimensioning arrow z corresponds to a z axis in a Cartesian coordinate system. On account of the great similarity of the embodiments described below with the thermistor 10 shown here, the designations of the axes are used analogously for the following figures.

Figure 2:
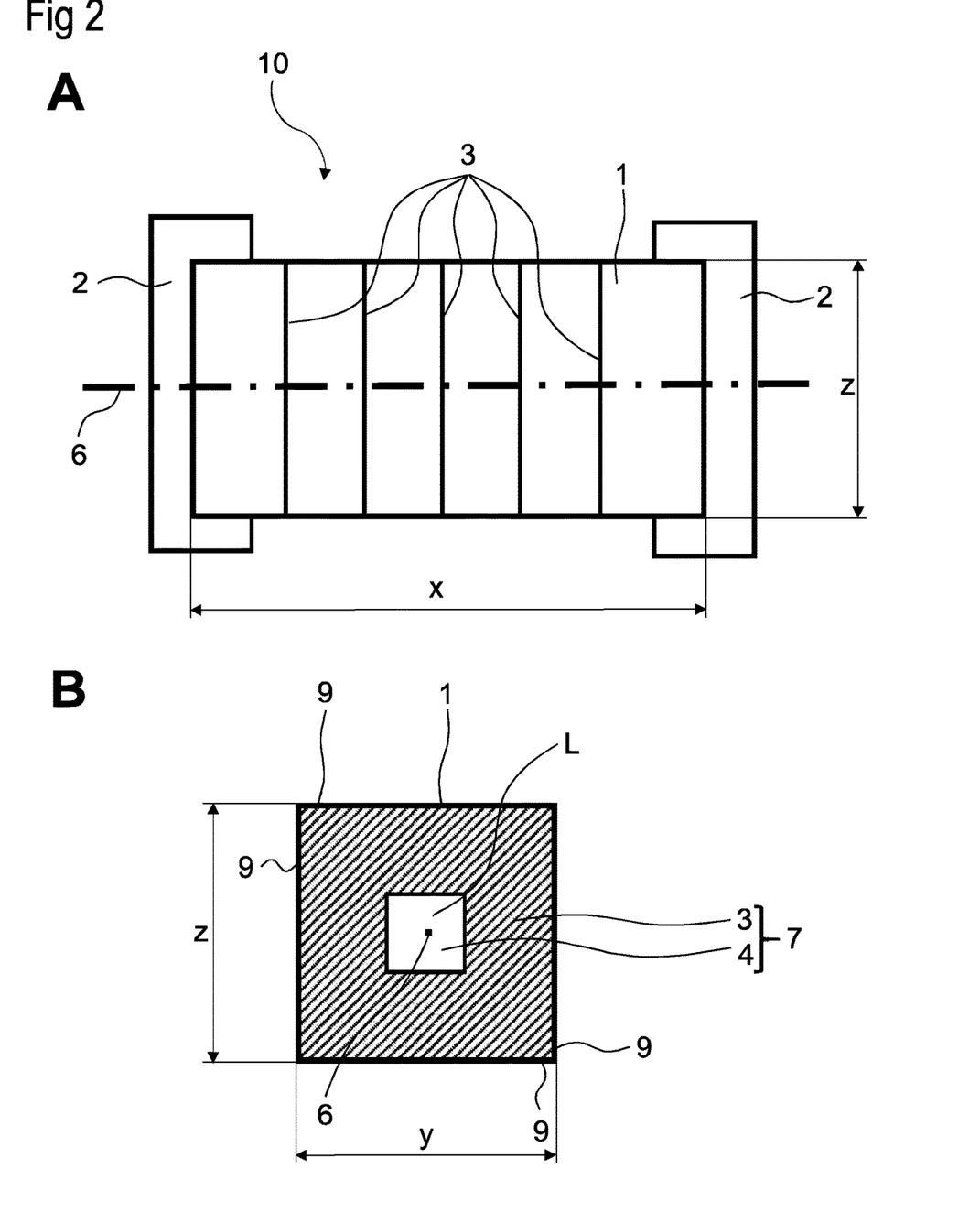
FIGS. 2A and 2B show an embodiment of a thermistor in longitudinal section and in cross section.

FIG. 2A shows in longitudinal section an embodiment of a thermistor 10 similar to that described in FIG. 1. The longitudinal section runs through the ceramic main body parallel to a plane which is defined by the x axis and the z axis of the ceramic main body. The ceramic main body 1 has five electrically insulating layers 3. Furthermore, the thermistor 10 has two outer contacts 2. The electrically insulating layers 3 are arranged parallel to one another. Furthermore, the electrically insulating layers 3 are arranged perpendicularly to a longitudinal axis 6 of the ceramic main body 1.

The longitudinal axis of the ceramic main body runs centrally through the ceramic main body and parallel to the x axis of the ceramic main body, the x axis corresponding to the direction of greatest extent of the ceramic main body 1. The direction of flow of the electrical current runs parallel to the x axis of the ceramic main body 1.

FIG. 2B shows a cross section of the thermistor 10 described in FIG. 2A. The cross section runs through the ceramic main body parallel to a plane which is defined by the y axis and the z axis of the ceramic main body. The electrically insulating layers 3 have a quadratic cutout 4. The surface area of the electrically insulating layer 3 plus the surface area of the cutout 4 corresponds to an actual cross-sectional area 7 of the ceramic main body. The actual cross-sectional area is exclusively delimited by outer surfaces 9. Furthermore, the electrically insulating layers 3 are formed in such a way that they are in direct contact with the outer surfaces 9 of the ceramic main body 1. The shape and size of the cutout 4 allow a conducting cross-sectional area L of the ceramic main body 1 to be precisely defined. This makes it possible to set the R25 value of the thermistor 10 very exactly. Here, the conducting cross-sectional area L corresponds to the surface area of the cutout 4.

Figure 3:
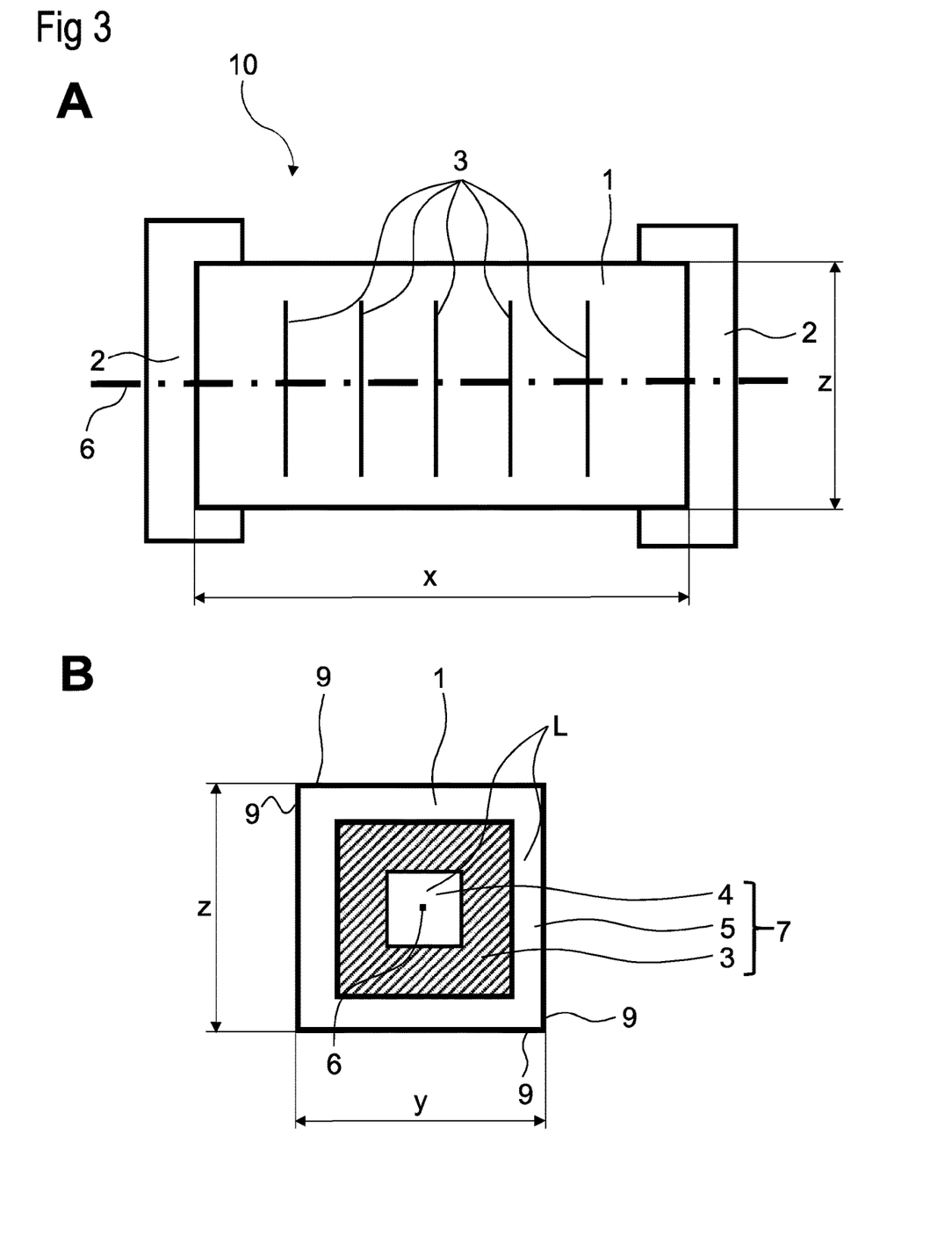
FIGS. 3A and 3B show a further embodiment of a thermistor in longitudinal section and in longitudinal cross section.

FIGS. 3A and 3B show in longitudinal section and in cross section a further embodiment of a thermistor 10 similar to that shown in FIGS. 2A and 2B, the electrically insulating layers 3 being kept at a distance from the outer surfaces 9 of the ceramic main body 1. This has the effect of forming a border region 5, which is not covered by the electrically insulating layer 3 and completely encloses the electrically insulating layers 3. The surface area of the cutout 4, the surface area of the electrically insulating layer 3 and the surface area of the edge region 5 together correspond to the actual cross-sectional area 7 of the ceramic main body, which is exclusively delimited by the outer surfaces 9. The conducting cross-sectional area L is defined here by the surface areas of the cutout 4 and of the border region 5. The electrically insulating layers 3 are kept at a distance from the outer surfaces 9 of the ceramic main body 1 as a result of the method for producing the ceramic main body 1. The configuration described here of the electrically insulating layers 3 has the effect that a delamination of green sheets from a green sheet stack that is formed during the production process of the ceramic main body 1 is effectively prevented.

Figure 4:
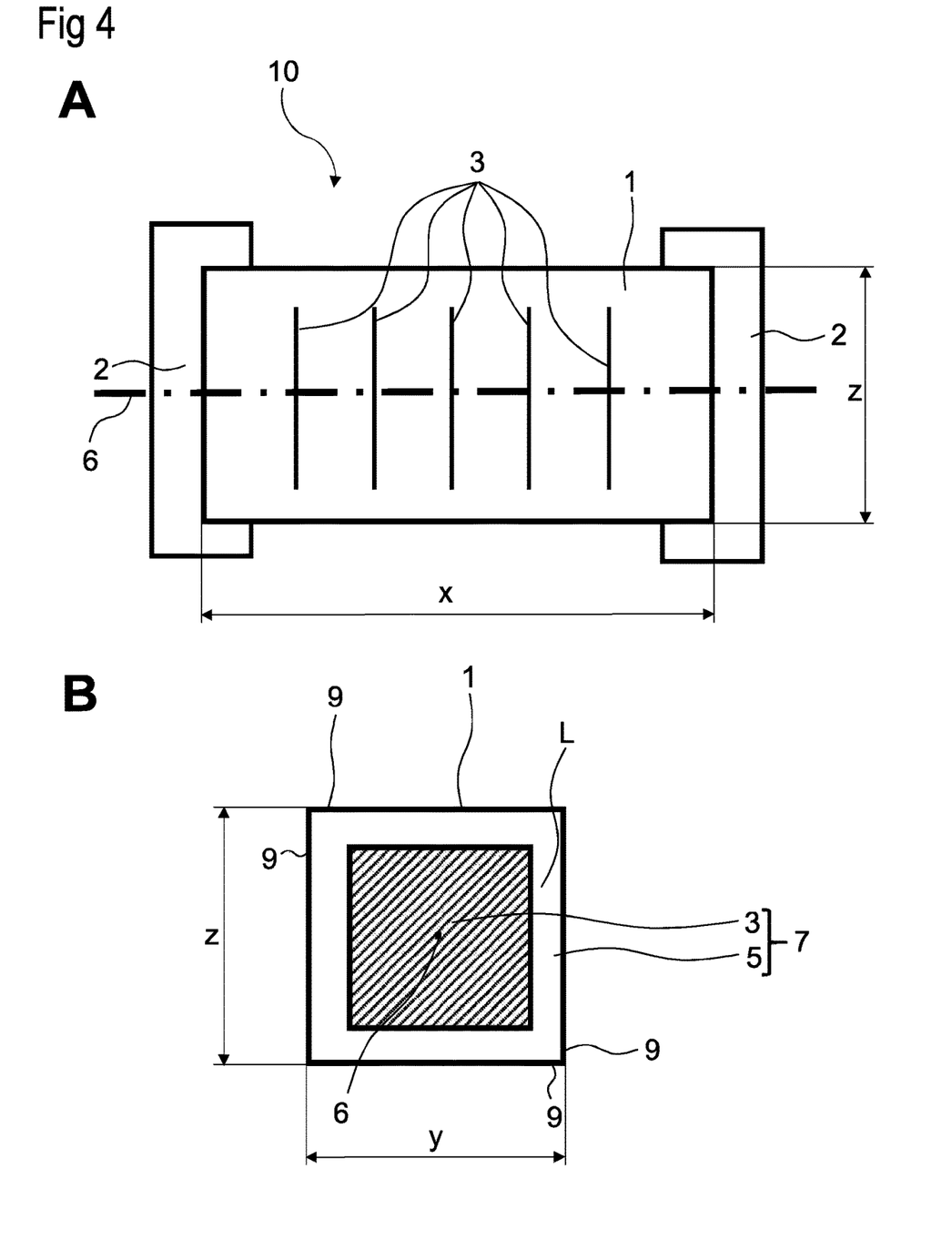
FIGS. 4A and 4B show a further embodiment of a thermistor in longitudinal section and in cross section.

FIGS. 4A and 4B show in longitudinal section and in cross section a further embodiment of a thermistor 10 similar to that shown in FIGS. 3A and 3B, the electrically insulating layers 3 of the ceramic main body 1 not having a cutout. In the case of this embodiment, the conducting cross-sectional area L is determined by the surface area of the border region 5, which completely encloses the electrically insulating layers 3. The surface areas of the electrically insulating layer 3 and of the border region 5 together correspond to the actual cross-sectional area 7, which is exclusively delimited by the outer surfaces 9. However, the electrically insulating layers 3 do not have to be thin, as indicated in FIG. 4A, but may be significantly wider, and consequently make up a significant portion of the extent of the ceramic main body 1 in the x direction.

Figure 5:
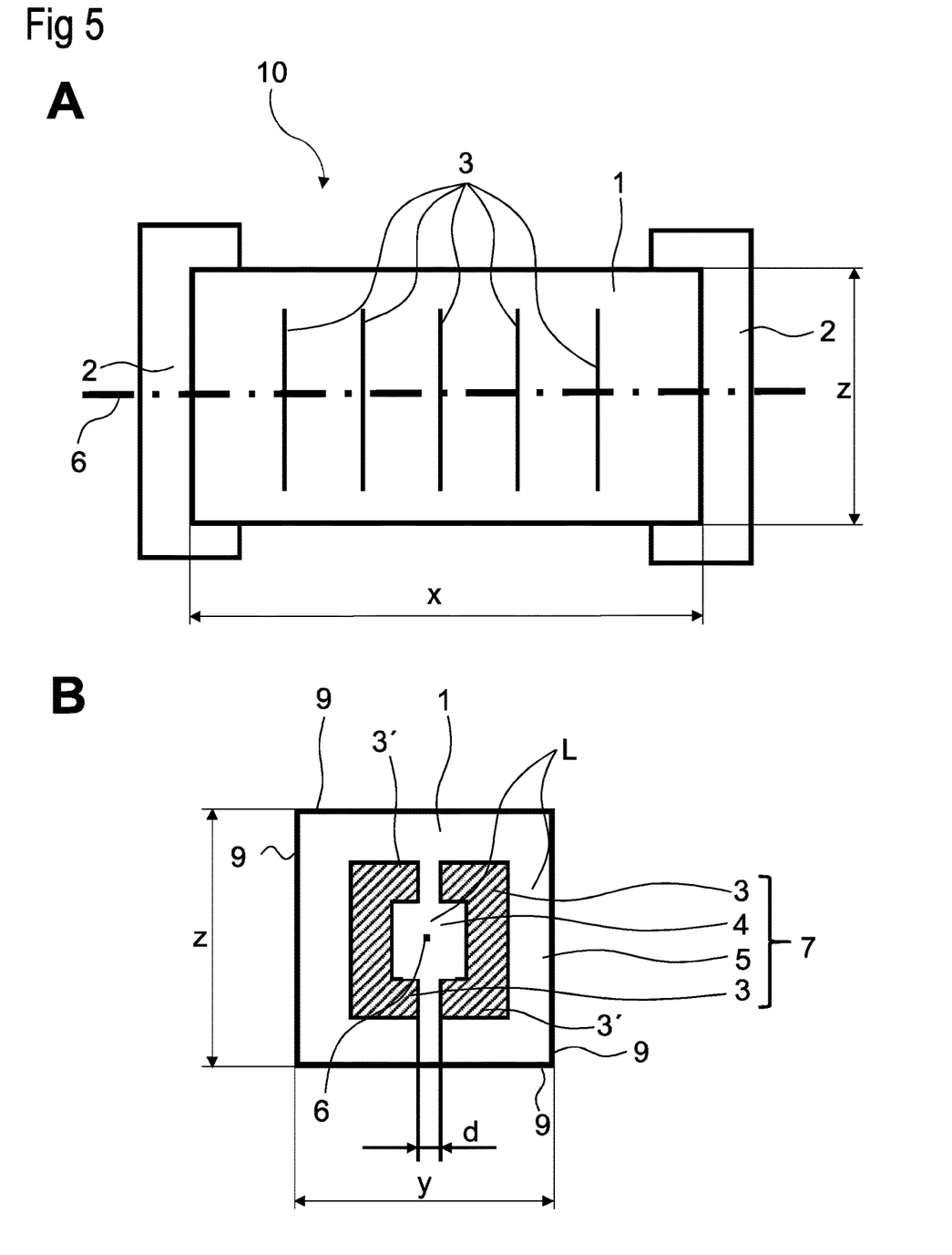
FIGS. 5A and 5B show a further embodiment of a thermistor in longitudinal section and in cross section.

FIGS. 5A and 5B show in longitudinal section and in cross section a further embodiment of a thermistor 10 similar to that shown in FIGS. 3A and 3B, the electrically insulating layers 3 respectively consisting of two sublayers 3'. The sublayers 3' are separated from one another by a distance d. The distance d is brought about by a screen printing screen having been used for applying the electrically insulating layers 3. The screen printing screen used for applying the electrically insulating layers 3 has a negative of the electrically insulating layer 3 and a bar, which divides the negative into the sublayers 3'. The width of the bar predetermines the distance d. Bending of the screen printing screen during the application of the electrically insulating layers 3 is largely prevented by the bar, whereby a high imaging fidelity of the electrically insulating layers 3 is achieved. The surface area of the cutout 4 and the surface area of the border region 5, which also extends up to the cutout 4 in the distance d, correspond to the conducting cross-sectional area L. The sum of the surface areas of the electrically insulating layer 3, the cutout 4 and the border region 5 corresponds to the actual cross-sectional area 7, which is delimited exclusively by the outer surfaces 9.

Figure 6:
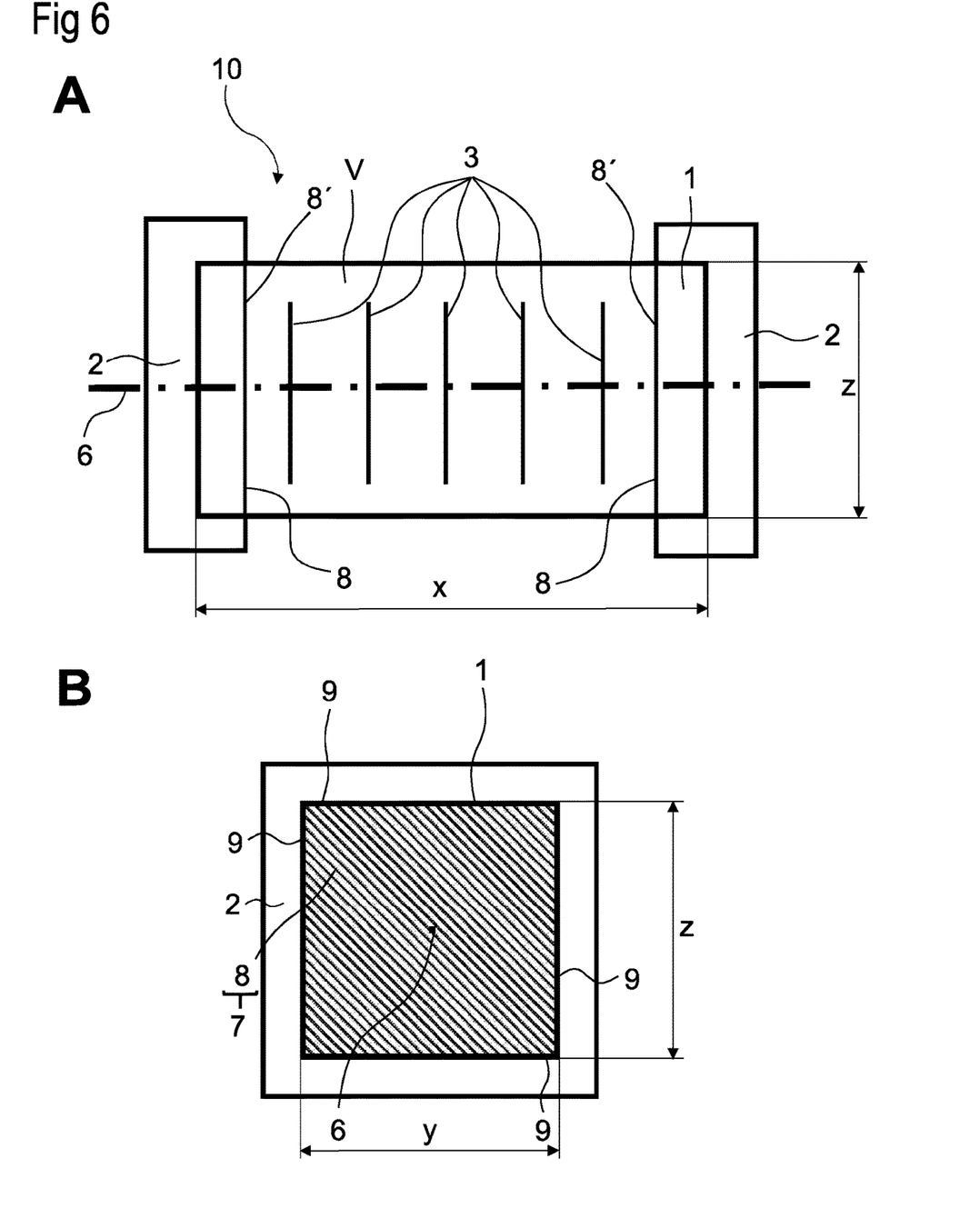
FIGS. 6A and 6B show shows a further embodiment of a thermistor in longitudinal section and in cross section.

FIGS. 6A and 6B show in longitudinal section and in cross section a further embodiment of a thermistor 10 similar to that described in FIGS. 3A and 3B. In addition to the electrically insulating layers 3, the ceramic main body 1 of the thermistor 10 comprises two electrically conductive layers 8, which contain silver. The cross section in FIG. 6B runs through one of the two electrically conductive layers 8. The electrically conductive layers 8 are configured in such a way that the electrically conductive layers 8 respectively extend over the entire actual cross-sectional area 7 of the ceramic main body. Furthermore, all of the secondary surfaces 8' of the electrically conductive layers 8 are in direct contact with the outer surfaces 9 of the ceramic main body 1. Also, the electrically conductive layers 8 are configured in such a way that they are in electrically conducting contact with the outer contacts 2 of the ceramic main body 1 by way of the secondary surfaces 8'. The electrically conductive layers 8 and the outer surfaces 9 of the ceramic main body delimit an active volume region V of the ceramic main body 1 within which the electrically insulating layers 3 are located. By their electrically conducting contact with the outer contacts 2, the electrically conductive layers 8 reduce negative effects that occur due to method-related deviations in the configuration of the outer contacts 2. As a result, thermistors with specific characteristic properties can be produced reproducibly.

The invention is not restricted to the embodiments shown. In particular, the number, the position and the configuration of the electrically insulating layers 3 and the electrically conductive layers 8 may vary.

LIST OF DESIGNATIONS

1 Ceramic main body
2 Outer contacts
3 Electrically insulating layer
3' Sublayer
4 Cutout
5 Border region
6 Longitudinal axis
7 Actual cross-sectional area
8 Electrically conductive layer
8' Secondary surface 9 Outer surface
10 Thermistor
d Distance
L Conducting cross-sectional area
V Active volume region

The invention claimed is:

1. A thermistor, having a ceramic main body, which contains a ceramic material as the main constituent, and having at least two outer contacts, wherein
   the ceramic main body has at least one electrically insulating layer,
   the electrically insulating layer is arranged within the ceramic main body,
   the electrically insulating layer contains a main component which has a composition different from the ceramic material,
   the electrically insulating layer is arranged within the ceramic main body in such a way that a conducting cross-sectional area of an active volume region of the ceramic main body is reduced, and
   the electrically insulating layer is arranged such that the electrically insulating layer is oriented perpendicular to a direction of flow of electrical current from one of the at least two outer contacts to another of the at least two outer contacts.

2. The thermistor according to claim 1,
   wherein the electrically insulating layer lies in a plane and the electrically insulating layer is kept at a distance from one or more outer surfaces of the ceramic main body that intersect the plane.

3. The thermistor according to claim 1,
   wherein the electrically insulating layer has at least one cutout.

4. The thermistor according to claim 1,
   wherein the electrically insulating layer contains a main component which comprises an inorganic, electrically insulating material.

5. The thermistor according to claim 4,
   wherein the inorganic, electrically insulating material is a varistor ceramic or a capacitor ceramic.

6. The thermistor according to claim 1,
   wherein the electrically insulating layer contains a main component which has a spinel structure.

7. The thermistor according to claim 1,
   wherein the electrically insulating layer is formed as a cavity within the ceramic main body.

8. The thermistor according to claim 1, wherein the electrically insulating layer has a thickness of up to 5 μm.

9. The thermistor according to claim 1,
   wherein the ceramic main body has one or more electrically conductive layers, which are arranged within the ceramic main body in such a way that the electrically conductive layers define an active volume region of the ceramic main body and the electrically insulating layer is arranged within the active volume region.

10. The thermistor according to claim 9,
    wherein at least one of the electrically conductive layers is in direct contact with at least one outer surface of the ceramic main body.

11. The thermistor according to claim 9,
    wherein the electrically conductive layers contain at least one material which is selected from a set of metals that includes at least silver, palladium and any silver and palladium alloys.

12. A method for producing a thermistor comprising a ceramic main body,
    wherein the ceramic main body is produced in such a way that a green sheet stack is formed from a multiplicity of green sheets, is subsequently pressed and sintered, a layer suitable for producing an electrically insulating layer being applied to at least one of the green sheets before the forming of the green sheet stack and wherein the electrically insulating layer is arranged within the ceramic main body in such a way that a conducting cross-sectional area of an active volume region of the ceramic main body is reduced, and
    wherein the layer suitable for producing the electrically insulating layer contains a thermally decomposable material which, after the sintering, forms an electrically insulating cavity.

13. The method according to claim 12,
    wherein the layer suitable for producing the electrically insulating layer contains an electrically insulating material.

14. The method according to claim 12,
    wherein an electrically conductive layer is applied to at least one further one of the green sheets.

15. The method according to claim 12,
    wherein the green sheets are stacked along a longitudinal axis of the ceramic main body.

16. A method for producing a thermistor comprising a ceramic main body,
    wherein the ceramic main body is produced in such a way that a green sheet stack is formed from a multiplicity of green sheets, is subsequently pressed and sintered, a layer suitable for producing an electrically insulating layer being applied to at least one of the green sheets before the forming of the green sheet stack and wherein the electrically insulating layer is arranged within the ceramic main body in such a way that a conducting cross-sectional area of an active volume region of the ceramic main body is reduced, and
    wherein a screen printing screen is used as a template to produce the electrically insulating layer, the screen printing screen having a negative of the electrically insulating layer and at least one bar that divides the negative into at least two separate regions.

17. The method according to claim 16,
    wherein the at least one bar is configured in such a way that the screen printing screen is not significantly deformed during the production of the electrically insulating layer, to thereby achieve a high imaging fidelity of the electrically insulating layer with respect to the template.

18. A method for producing a thermistor comprising a ceramic main body,
    wherein the ceramic main body is produced in such a way that a green sheet stack is formed from a multiplicity of green sheets, is subsequently pressed and sintered, a layer suitable for producing an electrically insulating layer being applied to at least one of the green sheets before the forming of the green sheet stack and wherein the electrically insulating layer is arranged within the ceramic main body in such a way that a conducting cross-sectional area of an active volume region of the ceramic main body is reduced, and
    wherein at least two outer contacts are applied to the ceramic main body, the electrically insulating layer being arranged such that the electrically insulating layer is perpendicular to a direction of flow of electrical current between one of the at least two outer contacts to another of the at least two outer contacts.

19. A thermistor, having a ceramic main body, which contains a ceramic material as the main constituent, wherein
the ceramic main body has at least one electrically insulating layer,
the electrically insulating layer is arranged within the ceramic main body,
the electrically insulating layer contains a main component which has a composition different from the ceramic material,
the electrically insulating layer is arranged within the ceramic main body in such a way that a conducting cross-sectional area of an active volume region of the ceramic main body is reduced, and
the electrically insulating layer comprises at least two sublayers that lie in a common plane and are separate from each other by a distance.

* * * * *